United States Patent [19]
Kane et al.

[11] Patent Number: 5,845,967
[45] Date of Patent: Dec. 8, 1998

[54] BOOSTER SEAT

[75] Inventors: Michael T. Kane, East Aurora; David M. Bapst, South Wales; Douglas A. Soller, East Aurora, all of N.Y.

[73] Assignee: Fisher Price Inc., East Auror, N.Y.

[21] Appl. No.: 738,051

[22] Filed: Oct. 25, 1996

[51] Int. Cl.⁶ .............................. A47C 1/08; B60N 2/28
[52] U.S. Cl. ................ 297/250.1; 297/219.12; 297/225; 297/229; 297/228.12; 297/468; 297/473; 297/228.13; 24/129 B; 24/129 R; 33/512; 33/515
[58] Field of Search ............ 297/250.1, 217.2, 297/484, 354.13, 256.1, 468, 469, 473, 225, 228.12, 228.13, 229; 40/320; 24/129 B, 129 R, 129 A, 130; 33/512, 511, 485, 679.1, 515

[56] References Cited

U.S. PATENT DOCUMENTS

| | | |
|---|---|---|
| D. 303,878 | 10/1989 | Goldsmith . |
| 1,564,339 | 12/1925 | Fraser et al. ............ 297/217.2 X |
| 1,861,455 | 6/1932 | Schwartz ....................... 297/229 |
| 2,218,951 | 10/1940 | Flaharty ..................... 297/228.12 |
| 2,237,057 | 4/1941 | Meyer ....................... 297/228.12 |
| 2,469,520 | 5/1949 | Roberts, Jr. ................... 297/225 |
| 2,811,198 | 10/1957 | Krogh ............................ 297/225 |
| 3,094,356 | 6/1963 | Burke . |
| 3,103,385 | 9/1963 | Grieco . |
| 3,136,579 | 6/1964 | Hunter . |
| 3,207,552 | 9/1965 | Loughney, Jr. . |
| 3,220,769 | 11/1965 | Regan . |
| 3,262,736 | 7/1966 | Merelis . |
| 3,424,497 | 1/1969 | Brilmyer et al. . |
| 3,547,489 | 12/1970 | Grieser . |
| 3,563,600 | 2/1971 | Converse . |
| 3,606,453 | 9/1971 | Cicero . |
| 3,606,457 | 9/1971 | Reay . |
| 3,707,008 | 12/1972 | Fellin et al. ............ 297/250.1 X |
| 3,709,558 | 1/1973 | Jakob ......................... 297/250.1 |
| 3,713,695 | 1/1973 | Von Wimmersperg . |
| 3,784,224 | 1/1974 | Peeler . |
| 3,791,694 | 2/1974 | Roberts et al. ............. 297/250.1 |
| 3,819,230 | 6/1974 | Bloom ....................... 297/250.1 |

(List continued on next page.)

FOREIGN PATENT DOCUMENTS

| | | |
|---|---|---|
| 0 410 693 | 1/1991 | European Pat. Off. . |
| 2 347 010 | 4/1976 | France . |
| 1904412 | 8/1969 | Germany ................... 297/250.1 |
| 25 04 203 | 8/1975 | Germany . |
| 35 36 206 | 4/1987 | Germany ................... 297/250.1 |
| 2 154 131 | 9/1985 | United Kingdom ........ 297/250.1 |
| 2 215 594 | 9/1989 | United Kingdom ........ 297/250.1 |
| 2 261 591 | 5/1993 | United Kingdom . |

OTHER PUBLICATIONS

Mega Ref 3012; Routing of the three point Safety Belt.

*Primary Examiner*—Peter M. Cuomo
*Assistant Examiner*—Rodney B. White
*Attorney, Agent, or Firm*—Morgan, Lewis & Bockius LLP; C. Scott Talbot

[57] ABSTRACT

A molded booster seat has an upper back portion and a lower seat portion connected to an integral hinge. The upper and lower portions are pivoted about the integral hinge toward each other to form a rigid body, and cooperate to form a plurality of mortise and tenon joints. The upper and lower portions are locked in the rigid body configuration by a pair of side plates and a pair of locking rods extending through the seat between the side plates. The booster seat also includes an adjustable belt positioner that is configured to move between a plurality of different adjustments. The upper and lower positions are located to accommodate the fall range of sizes of children of a child sitting in the booster seat. The booster seat further includes indicia for indicating height limitations of a child sitting in the seat. The indicia can be labels attached to a seat cover disposed on the seat. Appropriately, the positions of the adjustable belt positioner can be located to accommodate children whose size falls within the indicated size limitations.

20 Claims, 9 Drawing Sheets

U.S. PATENT DOCUMENTS

| | | |
|---|---|---|
| 3,865,433 | 2/1975 | Stafford . |
| 3,948,556 | 4/1976 | Hyde et al. ............................ 297/250.1 |
| 3,957,303 | 5/1976 | Mauron ............................ 297/250.1 X |
| 3,964,787 | 6/1976 | Labadie et al. . |
| 3,975,037 | 8/1976 | Hontschik et al. . |
| 3,992,028 | 11/1976 | Abe et al. . |
| 4,067,608 | 1/1978 | Von Wimmersperg . |
| 4,099,770 | 7/1978 | Elsholz et al. . |
| 4,155,591 | 5/1979 | Mauron ............................ 297/250.1 X |
| 4,159,127 | 6/1979 | Czernakowski et al. . |
| 4,231,613 | 11/1980 | Jonasson et al. ...................... 297/250.1 |
| 4,285,545 | 8/1981 | Protze ...................................... 297/483 |
| 4,291,915 | 9/1981 | Cox . |
| 4,461,510 | 7/1984 | Cunningham et al. ............... 297/250.1 |
| 4,463,984 | 8/1984 | Molnar ................................. 297/250.1 |
| 4,500,135 | 2/1985 | Kincheloe ............................ 297/250.1 |
| 4,521,052 | 6/1985 | Cone ............................ 297/250.1 X |
| 4,568,122 | 2/1986 | Kain . |
| 4,591,208 | 5/1986 | McDonald et al. ............... 297/250.1 X |
| 4,597,588 | 7/1986 | Kawai ................................. 297/473 X |
| 4,603,903 | 8/1986 | Moscovitch . |
| 4,640,550 | 2/1987 | Håkansson ........................... 297/468 X |
| 4,643,474 | 2/1987 | Wise et al. ........................ 297/250.1 X |
| 4,653,809 | 3/1987 | Czernakowski et al. ......... 297/250.1 X |
| 4,687,255 | 8/1987 | Klanner et al. ................... 297/250.1 X |
| 4,694,511 | 9/1987 | Estes et al. ......................... 297/225 X |
| 4,824,168 | 4/1989 | Makoski ................................... 297/229 |
| 4,854,639 | 8/1989 | Burleigh et al. ...................... 297/250.1 |
| 4,958,886 | 9/1990 | Barattini et al. ......................... 297/229 |
| 5,082,325 | 1/1992 | Sedlack ................................ 297/250.1 |
| 5,098,161 | 3/1992 | Minami et al. ...................... 297/250.1 |
| 5,141,287 | 8/1992 | Grene ................................. 297/473 X |
| 5,150,947 | 9/1992 | Goshaw .................................... 297/229 |
| 5,158,337 | 10/1992 | Leggett ................................ 297/250.1 |
| 5,167,428 | 12/1992 | Garret et al. . |
| 5,228,746 | 7/1993 | Burleigh ............................... 297/250.1 |
| 5,236,221 | 8/1993 | Minami ................................. 297/250.1 |
| 5,260,684 | 11/1993 | Metzmaker . |
| 5,286,086 | 2/1994 | Gunji ................................... 297/250.1 |
| 5,358,310 | 10/1994 | Nemoto .............................. 297/473 X |
| 5,366,271 | 11/1994 | Johnston et al. ..................... 297/250.1 |
| 5,413,401 | 5/1995 | Koyannagi ........................... 297/250.1 |
| 5,524,964 | 6/1996 | Weimersheimer ............... 297/256.1 X |
| 5,580,126 | 12/1996 | Sedlack ............................ 297/250.1 X |

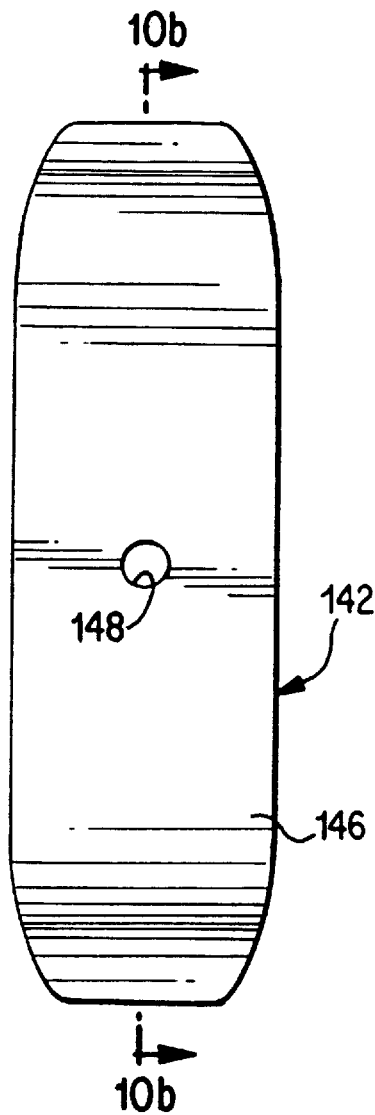 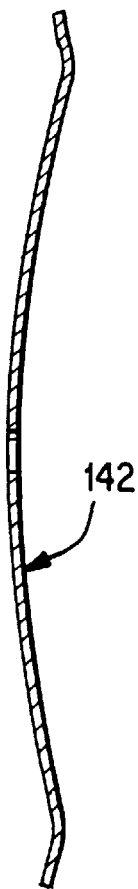
FIG. 10a
FIG. 10b

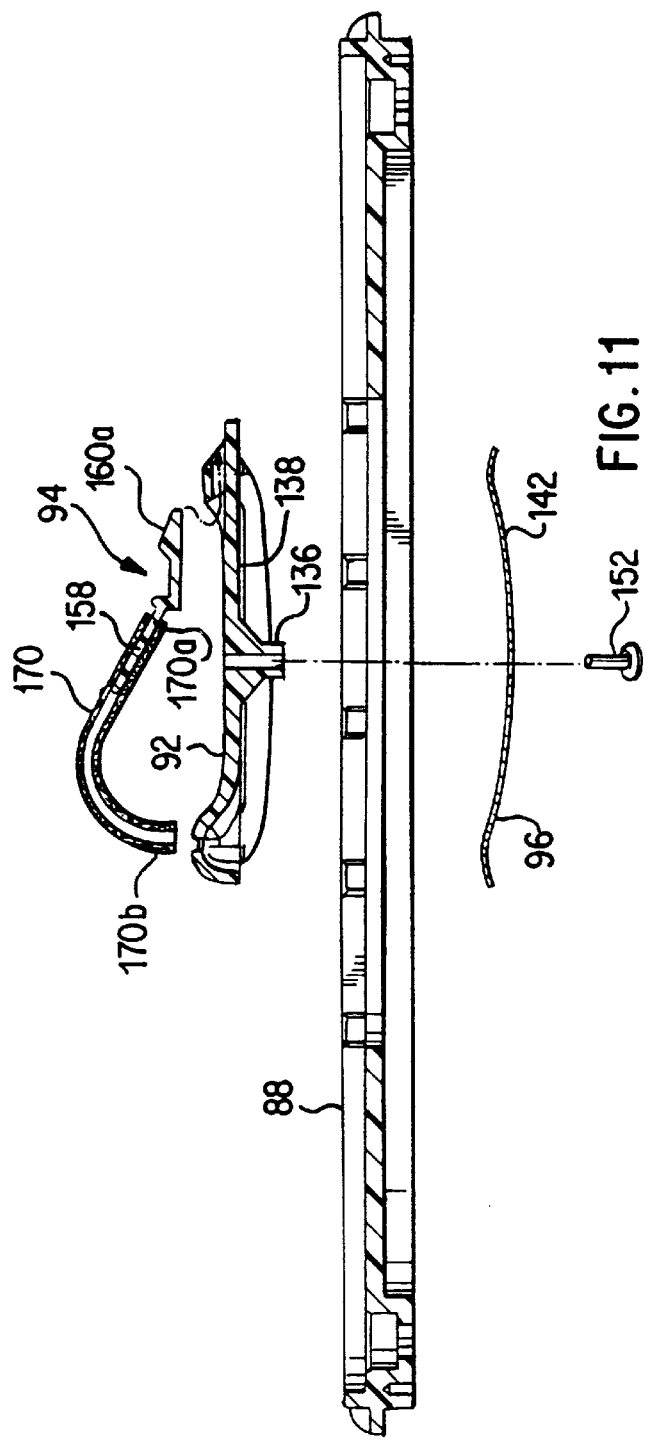
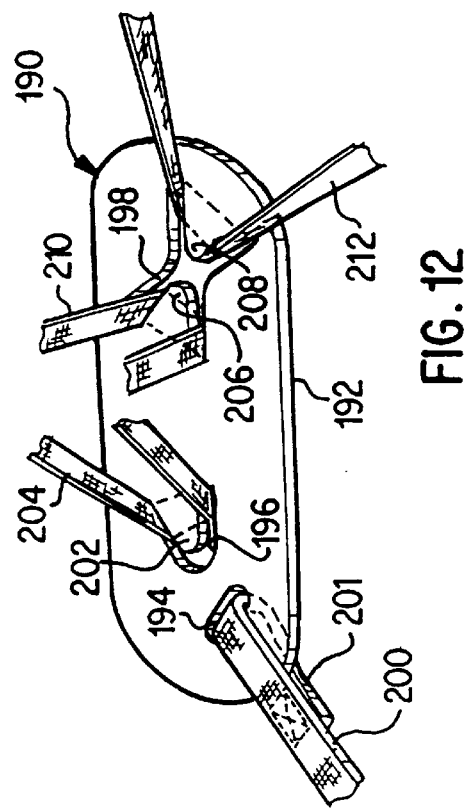

BOOSTER SEAT

The present invention generally relates to children's booster seats and particularly to booster seats incorporating adjustable shoulder belt positioners and size indicia for marking upper and lower height limits for children using the seats.

BACKGROUND OF THE INVENTION

Passenger restraint systems in automobiles are generally well suited to properly restrain adults but not well suited to properly restrain children. Accordingly, vehicle restraint systems must be supplemented by devices such as booster seats, which may be broadly defined as a seat that relies primarily on the vehicle's lap and shoulder belts to retain the seat in the vehicle and to restrain the child's torso, and includes a seat portion on which the child is seated to elevate the child above the vehicle's seating surface to a position in which the vehicle's shoulder belt is better positioned on the child, and may also include a back portion. A common construction technique for booster seats with backs is to mold the seat and back portions from rigid plastic and cover them with a cushion or pad.

Known booster seats designs suffer from several drawbacks. First, large L-shaped bodies (such as seats with back portions) tend to be relatively expensive and difficult to mold in one piece, especially if the seat includes wings and a lap belt path. Second, known booster seats do not adequately address the need to adjust and maintain the position of the vehicle shoulder belt relative to child's shoulder, particularly for children of different heights. Third, parents sometimes unknowingly use a booster seat for a child that is too small for the seat or a child that has outgrown the seat.

The manufacturing expense associated with a rigid molded body derives from the complex molding process required. One solution is to mold the seat as a plurality of separate, less complex, pieces and assemble the separate pieces into a rigid whole. Unfortunately, molding the seat as separate pieces requires additional tooling to mold the separate pieces and adds assembly steps, both of which add to the cost of manufacture. Thus, the savings due to less complex molding is offset by increased manufacturing and assembly costs. A molding technique that reduces complexity without increasing the number of molded pieces while allowing simple assembly would be welcome by seat manufacturers.

The failure to properly position the vehicle's shoulder belt relative to the child's shoulder can compromise the effectiveness of a booster seat. For optimum restraining effectiveness in an accident, the vehicle shoulder belt should lie on the child's shoulder. If the belt is positioned too high, the belt can impact the child's chin or neck, causing injury to soft tissue. If the shoulder belt is too low, it will lie off the child's shoulder, where it becomes relatively ineffective. It is therefore important to provide some mechanism for adjusting the shoulder belt's position to fit the child. Known devices for providing such adjustment suffer from drawbacks.

One design approach uses a fabric loop that is attached to the seat by hook and loop fasteners and which is wrapped around the shoulder belt to capture the belt and therefore to position the belt relative to the seat. One problem with this design approach is that he loops can be relatively easily dislodged as, for example, when the child shifts position in the car seat. When the loop becomes dislodged, it must be relocated, which can be inconvenient. A better approach would be an adjustable belt positioner that is firmly attached to the seat to avoid being inadvertantly dislodged and, therefore, more convenient and effective.

The third problem, like the second, is directly related to the size of the child using the booster seat. Booster seats are designed to fit children that fall within a certain size range. Placing a child that is too tall or too short in the seat may results in improper placement of the shoulder belt on the child and therefore a less effective restraint. Although seats are typically provided with explicit instructions to the user as to the approach size range for the seat, careless or inattentive parents may overlook or ignore these instructions and place an over- or under-sized child in the seat. Proper use of the seat could be made more likely if the seat included a direct visual indicator of whether a child is sized to safely use the seat.

SUMMARY OF THE INVENTION

The present invention provides a high back booster seat that overcomes the problems associated with known booster seats. In particular, the present invention provides a molding technique that permits a booster seat to be molded in a single piece having an upper back portion and a lower seat portion connected by an integral hinge. The upper and lower portions are pivoted about the integral hinge toward each other to form a rigid body, and cooperate to form a plurality of mortise and tenon joints. The upper and lower portions are locked in the rigid body configuration by a pair of side plates and a pair of locking rods extending through the seat between the side plates.

The invention also includes an adjustable belt positioner that is configured to move between a plurality of different adjustment positions. The upper and lower positions are located to accommodate the full range of sizes of children of a child sitting in the booster seat. While the positioner is movable, it is firmly coupled to the seat.

The invention further includes indicia for indicating height limitations of a child sitting in the seat. The indicia can be labels attached to a seat cover disposed on the seat. Appropriately, the positions of the adjustable belt positioner can be located to accommodate children whose size falls within the indicated size limitations.

BRIEF DESCRIPTION OF THE DRAWINGS

FIG. 10a is a top view of a spring for use with the belt positioner of FIG. 5.

FIG. 10b is a longitudinal section view of the spring taken along line 10b—10b of FIG. 10a.

FIG. 11 is an exploded section view taken along the longitudinal centerline of a belt positioner.

FIG. 12 is a perspective view of a softgoods clip for retaining a seat cover on the booster seat.

DETAILED DESCRIPTION OF THE DRAWINGS

Figure 1:
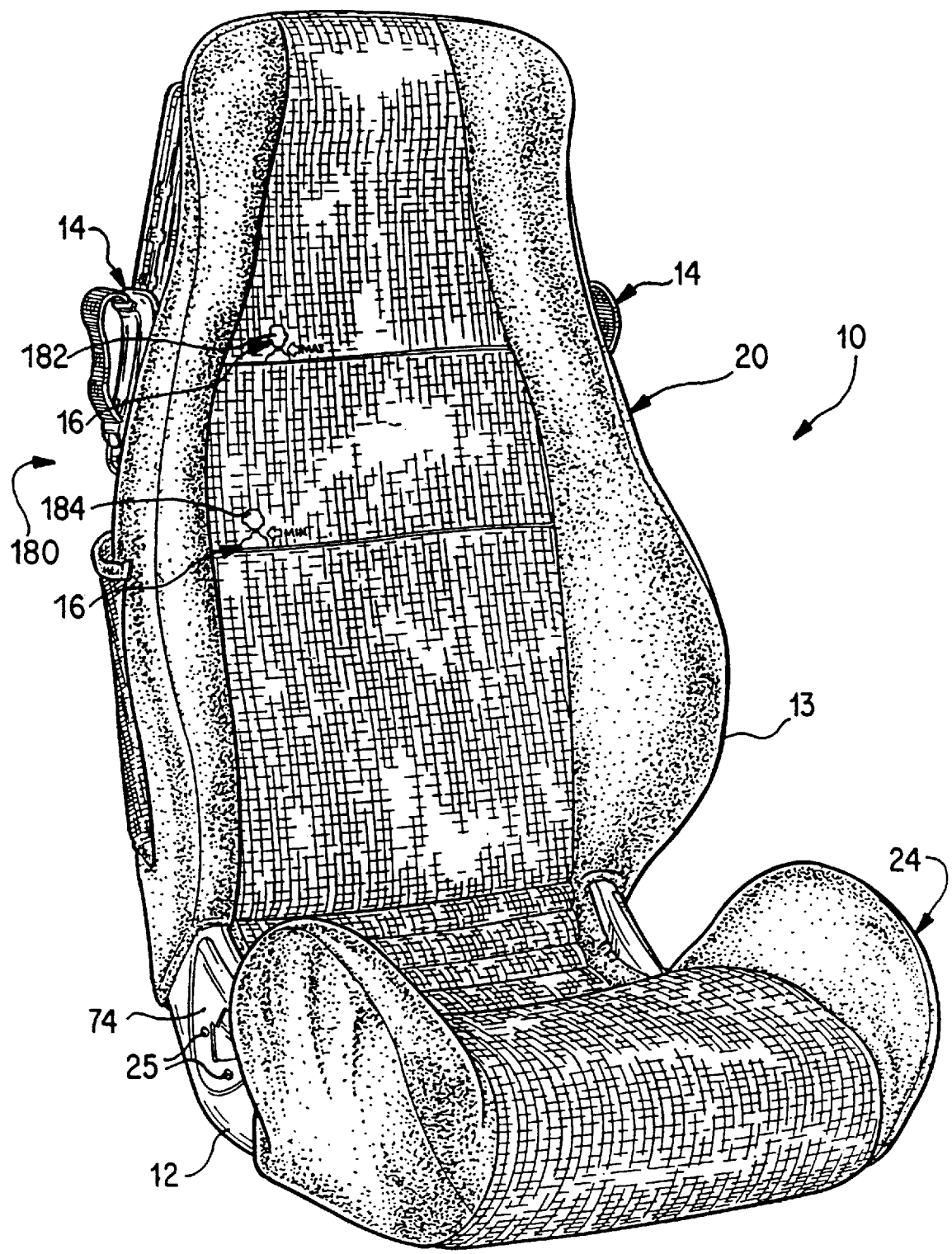
FIG. 1 is a perspective view of a booster seat illustrating the adjustable belt positioner and size indicia.
Figure 3:
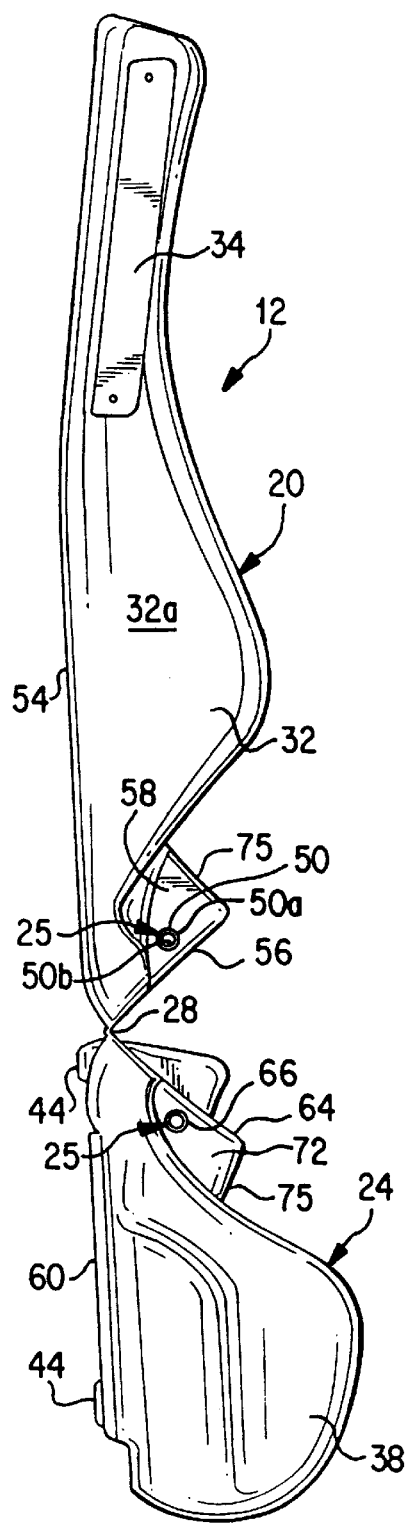
FIG. 3 is a side view of the shell in the flat configuration.
Figure 2:
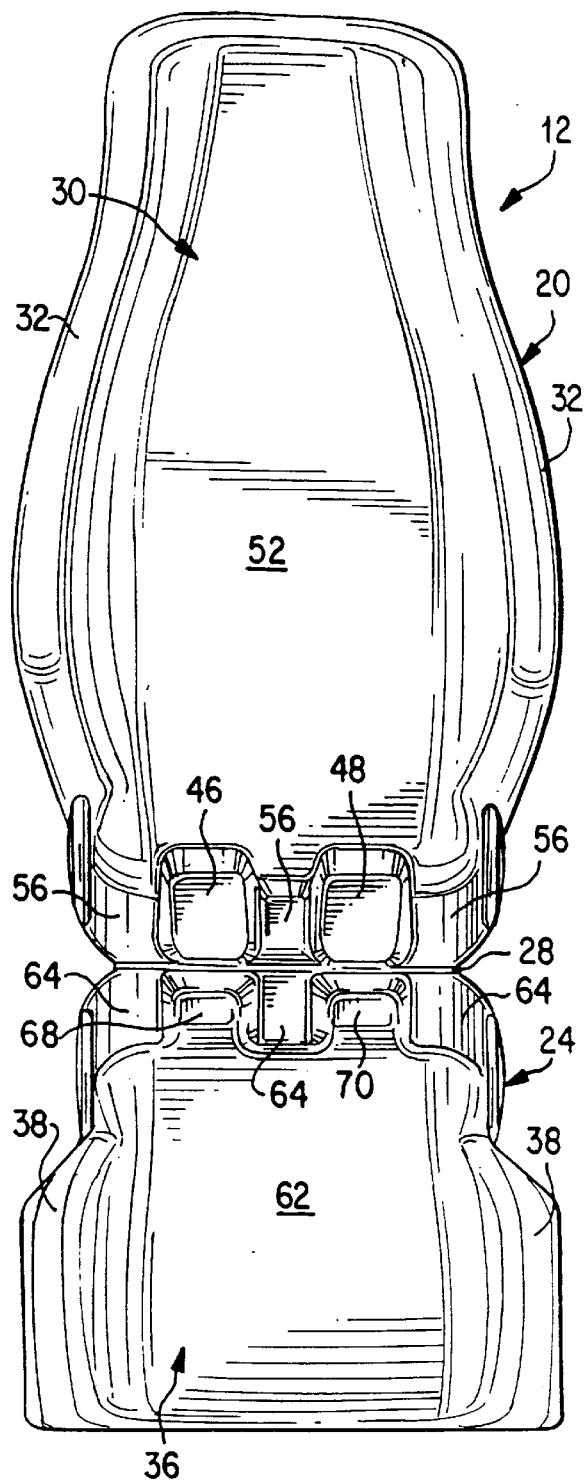
FIG. 2 is a plan view of a seat shell for use with the booster seat of FIG. 1 in a flat, as-molded, configuration.

An exemplary booster seat embodying the principles of the invention is shown in FIG. 1. The seat 10 includes a shell 12 (FIGS. 2–4) covered by a cushion or pad 13, a belt positioner 14 and size indicia 16.

Figures 4, 5:
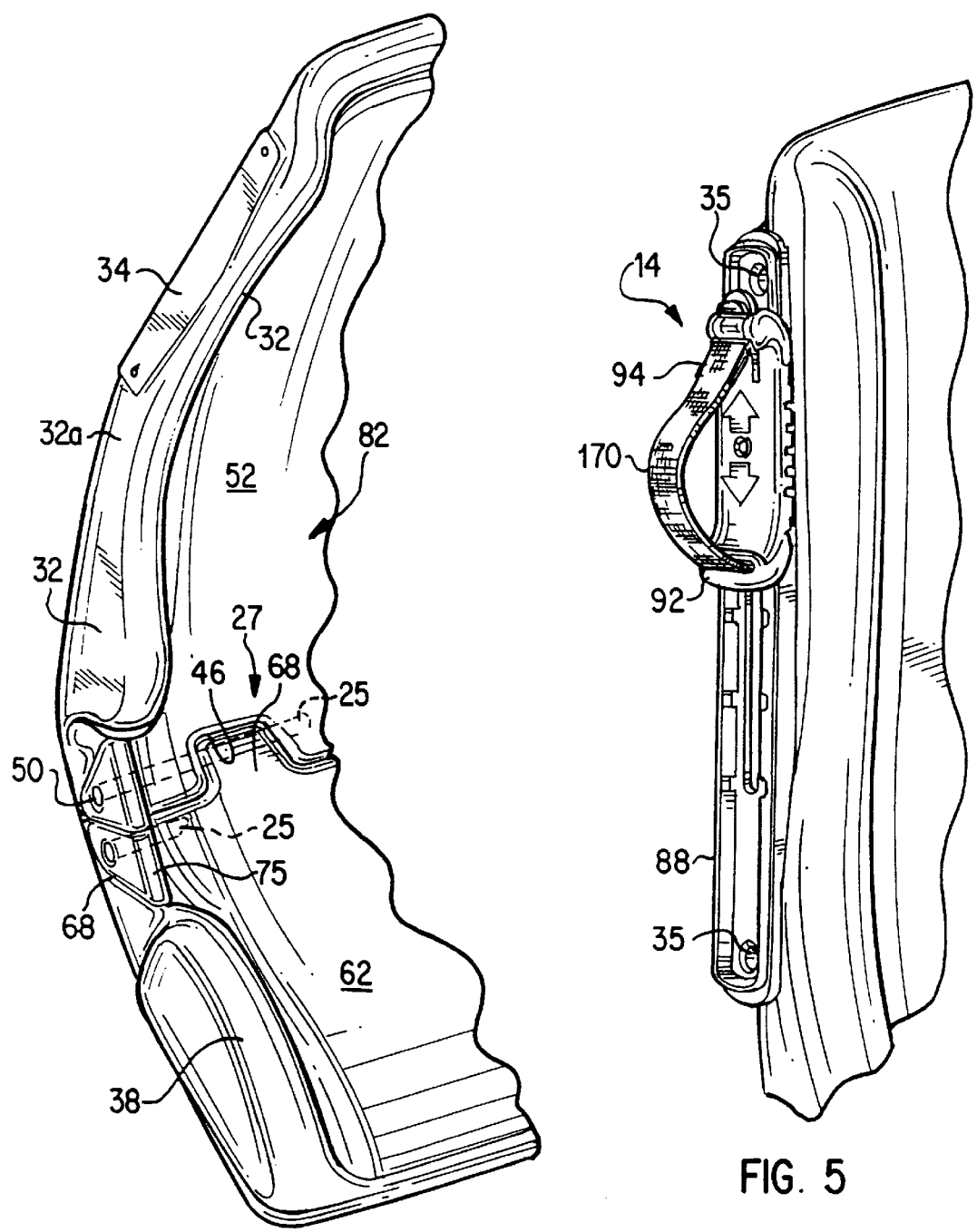
FIG. 4 is a partial isometric view of the shell of FIGS. 2–3 in a booster seat configuration.
FIG. 5 is a perspective view of a seat belt positioner for use with the seat of FIG. 1.
Figure 6A:
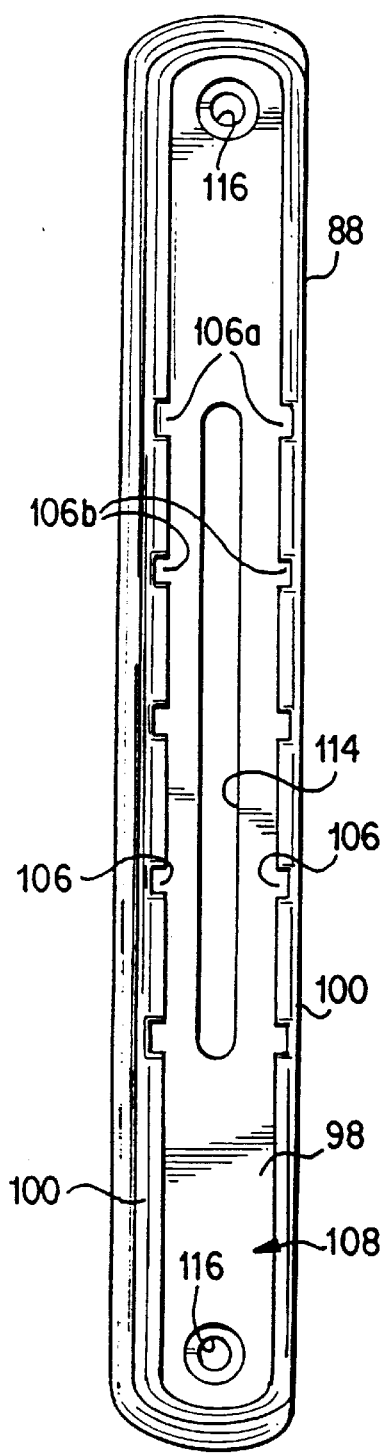
FIGS. 6a–6b are top and bottom views, respectively, of a rack for use with the belt positioner of FIG. 5.
Figure 6C:
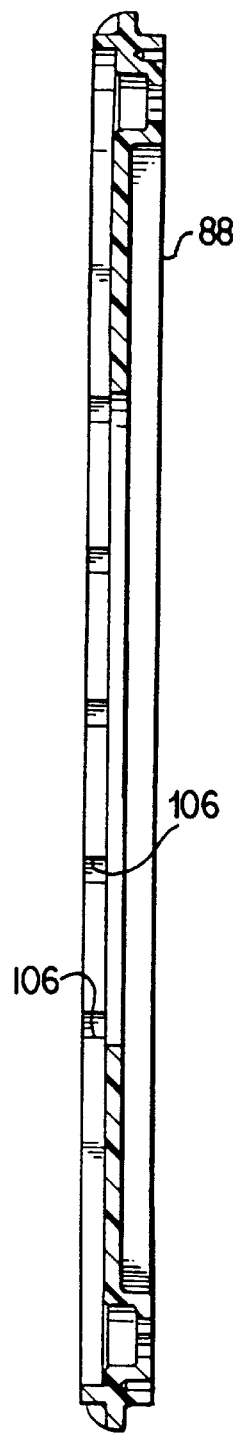
FIG. 6c is a longitudinal section view of the rack of FIGS. 6a–6b.
Figure 6B:
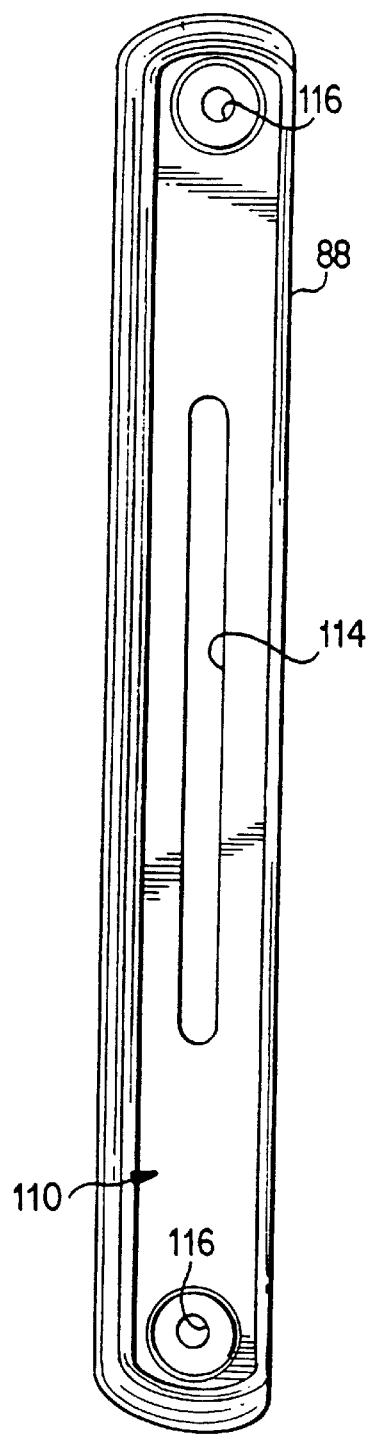
Figure 7A:
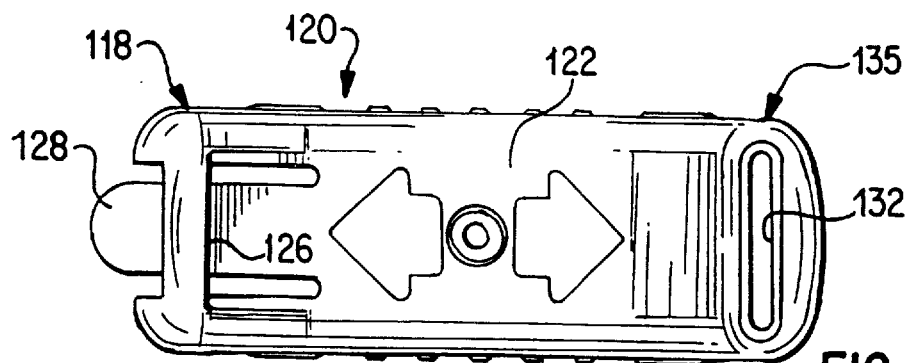
FIGS. 7a–7d are top, side, bottom and end views, respectively, of a cover plate for use with the belt positioner of FIG. 5.
Figure 7B:
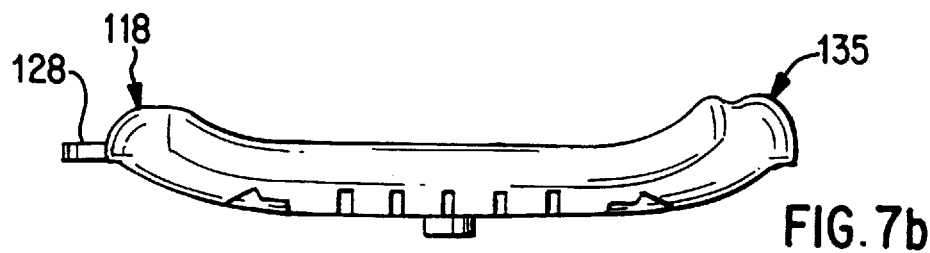
Figure 7C:
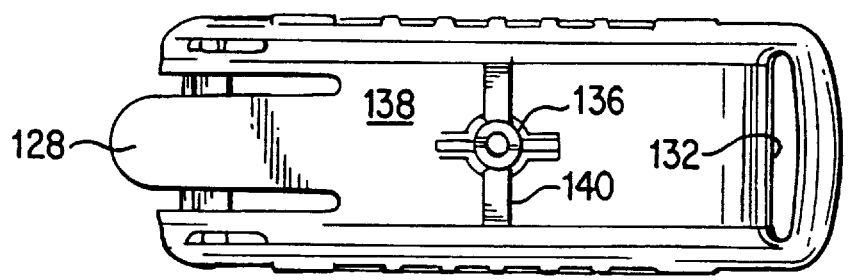
Figure 7D:
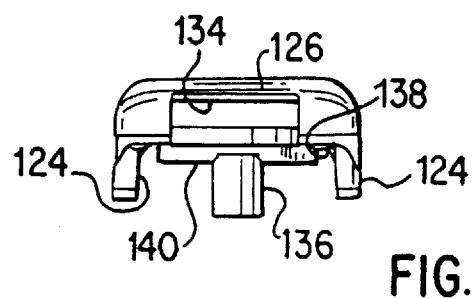
Figure 8A:
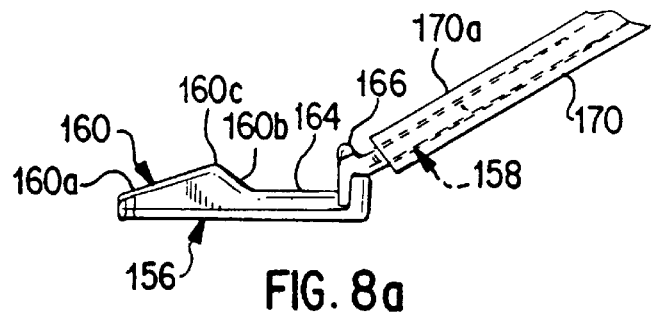
FIGS. 8a–8c are orthogonal views of a clip for use with the seat belt positioner of FIG. 5.
Figures 8B, 8C:
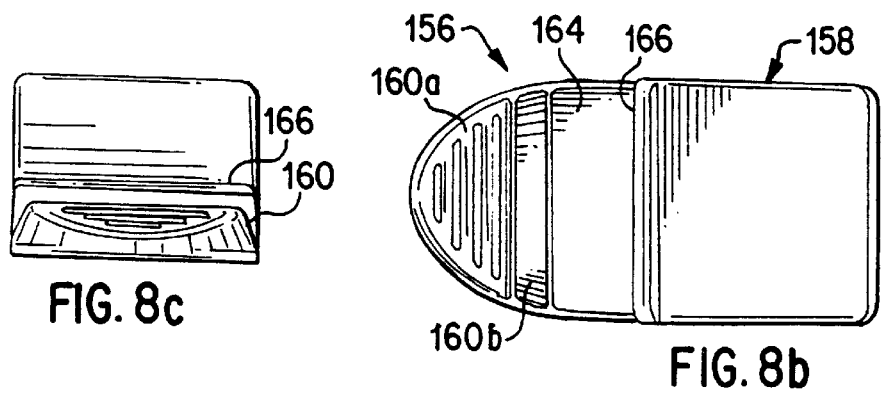

The shell 12 includes an upper back portion 20 and a lower seat portion 24 connected to each other by an integral, or living, hinge 28. Advantageously, the integral hinge 28 allows the shell to be molded as a single piece with the upper and lower portions 20, 24 essentially coplanar (FIGS. 2–3) while permitting the upper and lower portions 20, 24 to pivot toward each other about the hinge 28 to form a booster seat configuration (FIG. 4). When the upper and lower portions 20, 24 have been pivoted together, locking rods 25 extend through a connecting joint 27 (FIG. 4) formed by the upper and lower portions 20, 24 to lock the shell 12 in the booster seat configuration. In preferred embodiments, each rod 25 includes a pair of nails, with one nail extending in the seat from each side and going about half way across the seat.

The upper back portion 20 includes a back wall 30 and a pair of side walls 32 extending from the lateral edges of the back wall 30. Each side wall 32 includes an outer surface 32a facing away from the back wall 30 that includes a flat region 34 for receiving the belt positioner 14. The back wall 30 includes an inside surface 52, an outside surface 54, and an upper mating surface 56 that extends between the upper and lower surfaces 52, 54. The upper mating surface 56 includes a pair of mortises 46, 48 disposed in spaced-apart relation.

The lower seat portion 24 includes a back wall 36 and a pair of side walls 38. The back wall 36 includes an outside surface 60, an inside surface 62, and a lower mating surface 64 extending between the outside surface 60 and the inside surface 62. A pair of tenons 68, 70 project outwardly from the lower mating surface 64 and are disposed in spaced-apart relation to engage the mortises 46, 48, respectively.

The sidewalls 32 include apertures 50 and 66. Apertures 50 are aligned along an axis that extends through the upper back portion 20 and, preferably, through the connecting joint 27. Apertures 66 are aligned along an axis that extends through the lower seat portion 24. If desired, a handle recess (not shown) can be molded into the outside surface 54 of the back wall 30 to facilitate handling of the booster seat and a plurality of feet 44 can be formed in the back wall 36 of the lower seat portion 24.

The inside surfaces 52, 62 are undulatory and cooperate with each other in the booster seat configuration to provide an ergonomic child-supporting surface 82, as illustrated in FIG. 4. The upper and lower mating surfaces 56, 64 are formed at a predetermined angle relative to each other, and the predetermined angle is interrelated to the shape of the inside surfaces 52, 62 to provide a generally continuous inner surface 82 when the shell is in the booster seat configuration.

Figure 9A:
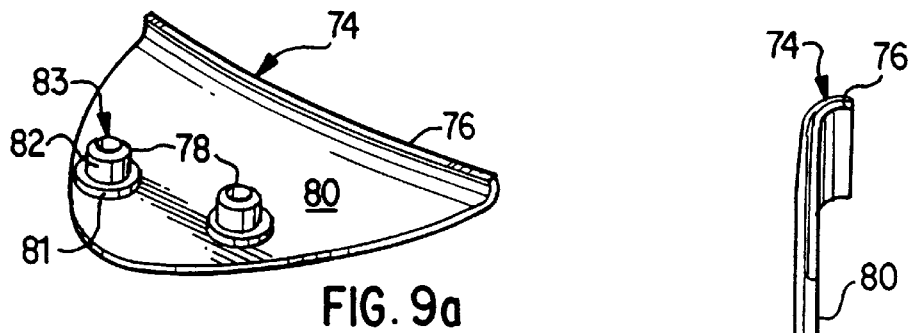
FIGS. 9a–9b are bottom and top isometric views of a side plate for use with the invention.
Figures 9B, 9C:
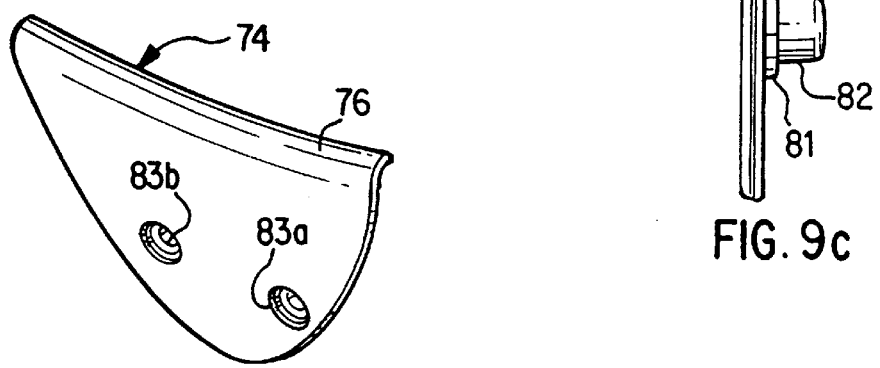
FIG. 9c is a side view of the side plate of FIGS. 9a–9b.
Figure 13:
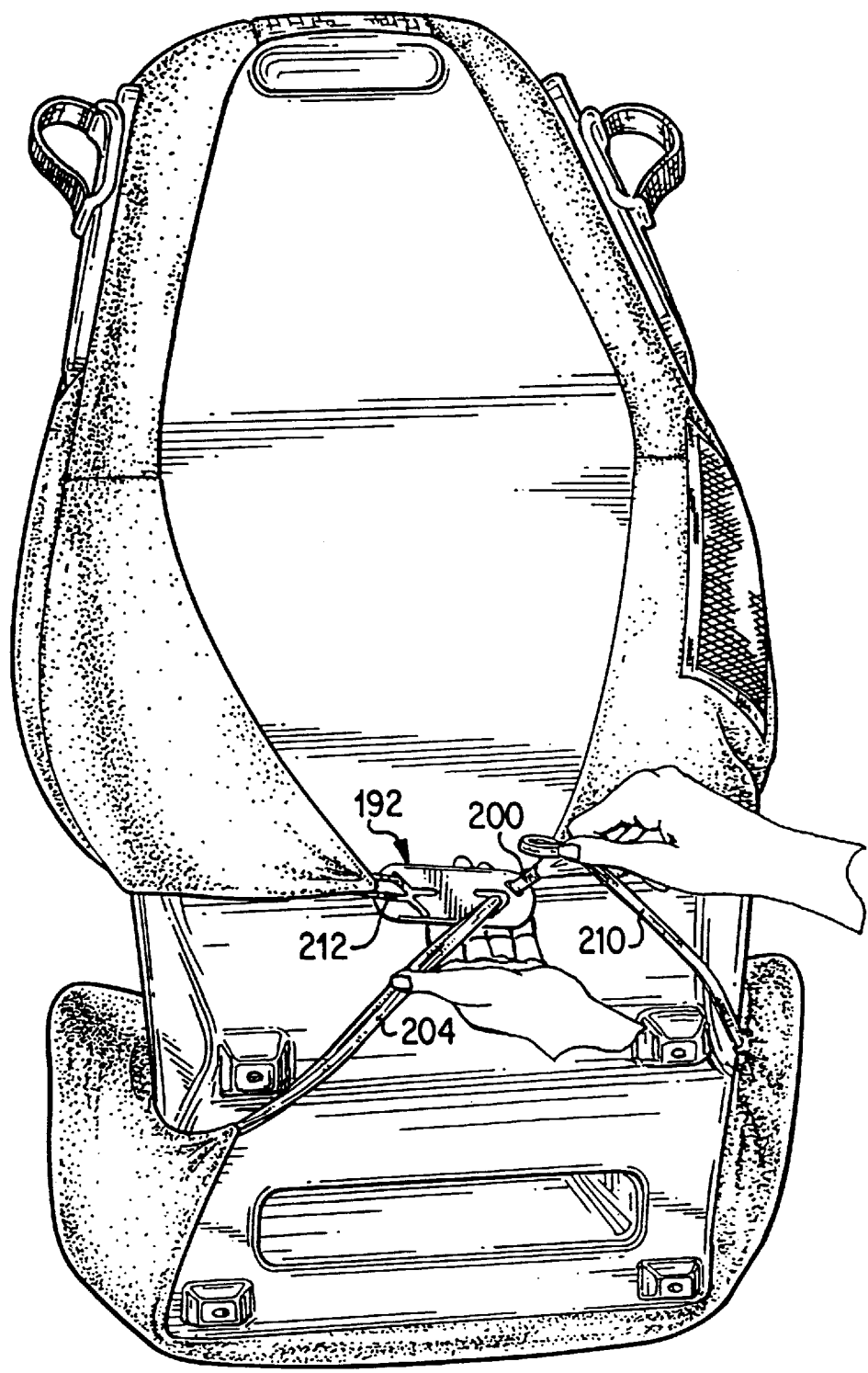
FIG. 13 is a rear perspective view of the booster seat of FIG. 1 showing the softgoods clip of FIG. 12 in position.

The seat also includes a pair of side plates 74 configured to engage and retain the shell 12 in the booster seat configuration. The side plates 74 illustrated in FIGS. 9a–9c, are generally triangular in shape and include a curved upper lip 76 and a pair of cylindrical bosses 78 extending from an inside surface 80 of the side plate 74. Each boss 78 includes an annular shoulder 81 at its base adjacent the inside surface 80 and a reduced diameter portion 82 extending from the shoulder 81. A central bore 83 extends through each boss 78 and generally conforms to the outer shape of the boss 78 so as to have a first portion 83a extending from the outer surface 85 into the annular shoulder 81, where it joins a reduced diameter portion 83b. The bosses 78 are positioned on the side plate 74 to engage the apertures 50, 66 when the shell 12 is in the booster configuration.

The apertures 50, 66 formed in the upper and lower portions 20, 24, respectively, include dual diameter portions to conformingly receive the bosses 78. Aperture 50 includes a first portion 50a sized and configured to receive the annular shoulder 81 and a reduced diameter portion 50b sized and configured to receive the reduced diameter portion 82. Aperture 66 is substantially similar to the aperture 50.

To assemble the seat in the booster seat configuration, the upper and lower portions 20, 24 are pivoted about the integral hinge 28 until the upper and lower mating surfaces 56, 64 are brought together. As the mating surfaces 56, 64 come together, the tenons 68, 70 formed on the lower mating surface 64 extend into, and engage, the mortises 46, 48 formed in the upper mating surface 56. When the mating surfaces 56, 64 abut each other, the mortises and tenons are fully engaged and the shell 12 is in the booster seat configuration. When the shell 12 is in the booster seat configuration, the side plates 74 are positioned adjacent the side walls 32, 38 to align the bosses 78 with the apertures 50, 66. The locking rods 25 extend between the central bores 83 of the bosses 78 on the side plates 74. In preferred embodiments, the apertures 50, 66 are aligned with the joint 27 so that the rods 25 extend through the mortises 46, 48 and the tenons 68, 70 to provide holding power to retain the shell 12 in the seat configuration.

Although the joint 27 has been described with reference to mortise and tenon joint in combination with a locking rod, it will be appreciated that mortise and tenon joint could include interlocking portions and eliminate the locking rod. For example, the tenons 68, 70 could include a transverse cap to form the tenons 68, 70 in a T-shape, when viewed from the top as in FIG. 2, and the mortises 46, 48 could include recesses formed to receive the caps on the tenons 68, 70 to lock the upper and lower portions 20, 24 together. Likewise, ridges could be formed on the sidewalls of the mortises or tenons and receiving grooves could be formed in the sidewalls of the tenons or mortises, respectively.

The adjustable belt positioner 14 is attached to the shell 12 at the flat region 34 as illustrated in FIG. 1. A preferred positioner 14 is illustrated in FIG. 5 and includes a rack 88, a cover plate 92, a clip 94 and a spring 96. The rack 88 is an elongated member having a base plate 98 and a pair of side walls 100 depending from the base plate 98. The side walls 100 extend upwardly and downwardly from the base plate 98 to define an upper channel 108 and a lower channel 110. The side walls 100 include a plurality of detents 106 arranged in pairs facing each other across the upper channel 108. The base plate 98 includes a central slot 114 extending longitudinally between the side walls 100 and a pair of fastener receiving apertures 116 centered at the ends of the base plate 98.

The cover plate 92 includes a carriage 120 having base plate 122, a pair of side walls 124 depending downwardly from the side edges of the base plate 122, and a clip retainer 126. A first end 118 of the base plate 122 includes a longitudinally extending resilient tongue 128. The clip retainer 126 extends upwardly from the side edges of the base plate 122 and across the first end 130 above the tongue 128, cooperating with the tongue 128 to form a transversely extending clip-receiving aperture 134. A transversely extending web-receiving aperture 132 passes through the base plate 122 at the second end 135 of the base plate 122.

A boss 136 projects downwardly from the bottom surface 138 of the base plate 122 so as to extend through, and engage, the slot 114 in the rack 88. An engaging shoulder 140 extends from the boss 136 transversely across the bottom surface 138 to engage the detent pairs 106 formed in the upper channel 108 of the rack 88. A spring 142 forms a resilient member for retaining the cover plate 92 on the rack 88. An exemplary spring 142, illustrated in FIGS. 10a–10b, includes a generally rectangular member 146 having a hole 148 centered therein. The spring 142 is substantially the same width as the lower channel 110 and is configured to slide back-and-forth therein. A fastener 152, such as a rivet, bolt, screw, or the like, attaches the spring 142 to the boss 136 to resiliently retain the cover plate 92 on the rack 88. The spring 142 allows a user to pull the cover plate 92 away from the rack 88 far enough to disengage the shoulder 140 from a detent pair, 106a for example, and move the cover plate 92 to a different position where the shoulder 140 engages another detent pair, 106b for example, without allowing the cover plate 92 to be completely removed from the rack 88.

The clip 94 includes a retainer-engaging portion 156 and a web-attachment portion 158. The engaging portion 156 includes a wedge 160 for fitting between the clip retainer 126 and the tongue 128, and a shoulder 166 separated from the wedge 160 by a flat segment 164. The web-attachment portion 158 includes a flat blade extending upwardly away from the shoulder 166 and is configured to receive a piece of webbing 170.

The wedge 160 is sized to be larger than the clip-receiving aperture 134 and includes a sloping leading surface 160a and a sloping trailing surface 160b that are joined at a peak 160c. When the clip 94 is being inserted into the clip-receiving aperture 134, the leading surface 160a cams against the clip retainer 94 to push the tongue 128 downwardly, effectively enlarging the aperture 134 to allow the wedge 160 to pass under the retainer 126. In similar fashion, when the clip 94 is removed from the aperture 134, the trailing surface 160b cams against the retainer 126 to push the tongue downwardly to allow the wedge 160 to clear the retainer 126. The sloping surfaces 160a, 160b advantageously allow the clip 94 to be inserted into, and removed from, the clip-receiving aperture 134 by using moderate force, while preventing the clip 94 from inadvertently falling out of the aperture 134.

The shoulder 166 is sized and configured to interfere with the clip retainer 126 to prevent further movement of the clip 94 into the clip-receiving aperture 134. As the wedge 160 enters the clip-receiving aperture 134 and clears the clip retainer 126, the resiliency of the tongue 128 pushes the clip 94 upwardly to position the flat segment 164 against the underside of the clip retainer 126. When the clip 94 is in position, the wedge 160 and the shoulder 166 lie on opposite sides of the clip retainer 126 and cooperate with the resilient tongue 128 to maintain the clip 94 in engagement with the clip retainer 126.

The clip 94 cooperates with the cover plate 92 and the piece of webbing 170 to retain a vehicle seat belt in the proper position. The webbing 170 preferably includes a tube of material having a first end 170a and a second end 170b. The first end 170a slides over and covers the web attachment portion 158, preferably by stitching, and the second end 170b is passed through the web-receiving aperture 132. Once through the aperture 132, the second end 170b is folded back against itself and stitched thereto. The goal of stitching the second end 170b to itself is to ensure that the second end 170b does not back out through the aperture 132 under ordinary usage.

The assemble positioner 14 is positioned against the flat region 34 of the sidewalls 32 through an opening in the cushion 13, preferably with one positioner 14 on each side of the shell 12. Screws, rivets or other suitable fasteners 35 extend through the fastener-receiving apertures 116 and through the side wall 32 to rigidly attach the belt positioner 14 to the shell 12. Of course, adhesives, bonding agents, or the like can be used to attach the positioner 14 to the shell 12. Preferably, the cushion 13 includes tabs (not shown) that can be positioned between the rack 88 and the sidewall 32 to hold the cushion 13 in place at the belt positioner 14. It will be appreciated that the cushion 13 can also be produced without an opening for the belt positioner 14, with the fasteners 35 directed through the cushion 13.

Operatively, the cover plate 92 straddles the side walls 124 of the rack 88 with the engaging shoulder 140 disposed in one pair of detents 106 and the boss 136 extending downwardly through the slot 114. The spring 142 is disposed in the lower channel 110 and the fastener 152 attaches the spring to the boss 136, thereby retaining the cover plate 92 on the rack 88. To position the seat belt shoulder strap, the clip 94 is removed from the clip-receiving aperture 134, the shoulder strap is laid against the cover plate 94 and the clip 94, with the webbing 170 attached, is passed over the seat belt and inserted into the aperture 134. Thus, the cover plate 92 webbing 170 and clip 94 complete a circuit surrounding the shoulder strap. Advantageously, the clip/webbing combination retains the seat belt in the proper position under ordinary conditions, but permits the seat belt to move as necessary in the event of an impact. Thus, the adjustable belt positioner 14 of the invention does not provide a load path for the seat belt during an accident.

Another important feature of the invention provides indicia 180, useful to parents, for determining whether the booster seat 16 is appropriate for a particular child. The indicia 180 includes markers for indicating the maximum 182 and minimum 184 height, respectively, of a child seated in the booster seat 10. Accordingly, a parent positions the child in the seat and ensures that the top of the child's shoulders falls between the markers 182,184. If the top of the child's shoulders falls outside the indicated range, the child is either too large or too small. Of course, the indicia 180 could be used to indicate head height of an appropriately sized child rather than shoulder height.

The indicia 180 include tabs or markers affixed to the seat 10. In preferred embodiments, the indicia includes fabric tabs stitched to the pad 13. However, any suitably durable material and any suitable attachment method can be used. For example, the indicia 180 can be integral with the pad 13 or the indicia 180 can be formed on the shell 12, with apertures formed in the pad 13 to expose the indicia 180.

A further aspect of the invention includes a softgoods clip 190 for retaining the pad 13 on the shell 12. In a preferred embodiment, the clip 190 includes a flat plate 192 having three apertures 194, 196, 198. Aperture 194 is generally oval and is sized to receive a first cord 200 that is attached to the pad 13 at a first position. Cord 200 is preferably elastic and includes a first end 201 that is passed through the aperture 194 and stitched to itself, thereby permanently attaching the clip 190 to the pad 13. Aperture 196 is a V-shaped opening, forming a V-shaped tab 202 having an apex pointed generally at aperture 194. The tab 202 is configured to removably receive a second cord 204 attached to the pad 13 at a second position generally opposite the attachment point of the first cord 200. Aperture 198 is an X-shaped opening, forming second and third opposing V-shaped tabs 206, 208. The opposing tabs 206, 208 are oriented to removably receive third and fourth cords 210, 212 that are attached to the pad 13 at third and fourth positions, such that the clip 190 receives cords from four separate positions on the pad 13. Preferably, all of the cords are elastic and cords 204, 210, 212 include loops for engaging the first, second and third tabs 202, 206, 208. Of course, additional apertures can be included to receive additional cords from, for example, opposite sides of the pad 13, without departing from the scope of the invention.

The various features of the invention have been described in relation to a child's booster seat. However, it will be appreciated that any of the features, such as the size indicia, for example, can be used on any seat, and the features described are not limited to use on booster seats. Moreover, variations and modifications exist which would not depart from the scope of the invention. For example, the locking rods 25 need not extend all the way across the connecting joint.

We claim:

1. A seat for restraining a child in a vehicle, the seat comprising:
    a shell having an upper back portion and a lower seat portion, the upper back portion and the lower seat portion being connected by an integral hinge, the upper and lower portions being movable about the hinge between a flat configuration and a seat configuration and including means for cooperating with each other to retain the booster seat in the seat configuration, wherein the upper and lower portions are configured to form a lockable mortise and tenon joint therebetween, each of the upper and lower portions being configured to receive a locking rod to lock the upper and lower portions together; and
    size indicia disposed at predetermined locations relative to the upper back portion indicating a height limit for a child seated in the seat.

2. A seat for restraining a child in a vehicle, the seat comprising:
    a shell having an upper back portion and a lower seat portion;
    a belt positioner adjustable coupled to the upper back portion for positioning a shoulder belt relative to the child, the belt positioner including a rack attached to the upper back portion and having a longitudinally extending slot, a cover plate with a post disposed in the slot for longitudinal movement therein, a clip pivotally coupled to a first end of the cover plate, and means for retaining a seat belt, the retaining means extending from a second end of the cover plate to the clip and cooperating with the cover plate to form a conduit for guiding a seat belt; and
    size indicia disposed at predetermined locations relative to the upper back portion indicating a height limit for a child seated in the seat.

3. A child's car seat positionable in a vehicle seat to accommodate a child occupant to be restrained by a shoulder belt of the vehicle, said car seat comprising:
    a seat shell having an upper, back portion and a lower, seat portion; and
    a shoulder belt positioner having:
        a fixed portion mounted to said back portion;
        a moveable portion slidably mounted to said fixed portion for movement between an upper limit and a lower limit; and
        means mounted to said moveable portion for releaseably retaining the vehicle's shoulder strap.

4. The child's car seat of claim 3, wherein said shoulder strap retaining means includes an elongate flexible member having a first end fixed to said moveable portion and an opposite, second end releaseably coupleable to said moveable portion, the shoulder strap being retainable between said flexible member and said moveable portion when said second end is coupled to said moveable portion.

5. A shoulder belt positioner for use on the back portion of a child's car seat to position a shoulder belt at an appropriate height for a child occupant of the seat, said shoulder belt positioner comprising:
    a fixed portion mountable to the seat's back portion, said fixed portion including a rack;
    a moveable portion slidably mounted to said fixed portion for movement between an upper limit and a lower limit to accommodate different sized children, said moveable portion including a cover plate having means for locking the cover plate in position relative to the rack; and
    means mounted to said moveable portion for releaseably retaining the vehicle's shoulder strap.

6. The seat of claim 5 wherein the locking means includes a plurality of locking detents formed on the rack and a shoulder formed on the cover plate for engaging the detents to lock the cover plate to the rack at one of a plurality of predetermined positions.

7. A shoulder belt positioner for use on the back portion of a child's car seat to position a should belt at an appropriate height for a child occupant of the seat, said shoulder belt positioner comprising:
    a fixed portion mountable to the seat's back portion;
    a moveable portion slidably mounted to said fixed portion for movement between an upper limit and a lower limit to accommodate different sized children; and
    means mounted to said moveable portion for releaseably retaining the vehicle's shoulder strap, said shoulder strap retaining means including an elongate flexible member fixed at a first end to said moveable portion and releaseably coupled at an opposite, second end to said moveable portion.

8. A method for manufacturing a child's seat comprising the steps of:
    molding a unitary shell having an upper back portion and a lower seat portion hingedly connected by an integral hinge, one of the upper and lower portions having a mortise and the other of the upper and lower portions having a tenon configured to engage the mortise;
    pivoting the upper and lower portions toward each other about the integral hinge to join the mortise and tenon.

9. The method of claim 8 further including the step of locking the mortise and tenon joint to prevent further movement about the integral hinge.

10. The method of claim 9 wherein the seat further includes a hole extending through the mortise and tenon joint and the locking step includes the step of inserting a locking rod into the hole.

11. The method of claim 10 wherein passage of the locking rod through the mortise and tenon joint forms the hole.

12. The method of claim 9 wherein the locking step includes the step at inserting locking rods into the joint.

13. The method of claim 8 wherein one of the upper and lower portions further includes pair of mortises in spaced-apart relation and the other of the upper and lower portions further includes a pair of tenons in spaced-apart relation the pair of tenons being aligned to engage the pair of mortises.

14. A seat comprising:

a seat body having a front seating area and a back;

a seat cover disposed to substantially cover said front seating area and having a clip retaining cord and a plurality of attachment loops depending therefrom; and a clip operatively disposed adjacent the back and attached to the seat cover, said clip including a plurality of loop-receiving apertures, each of said plurality of loop-receiving apertures being configured to releaseably receive at least one attachment loop, said clip being non-releaseably coupled to said retaining cord, whereby said seat cover is retained on said seat body by engagement of said loops with said apertures.

15. A seat comprising:

a seat body having a front seating area and a back;

a seat cover disposed to substantially cover said front seating area and having a plurality of attachment loops depending therefrom; and a clip operatively disposed adjacent the back and attached to the seat cover, the clip including a plurality of apertures, each of the plurality of apertures being configured to releaseably receive at least one loop, the plurality of apertures including a first aperture for non-removably receiving a cord attached to the seat cover to attach the clip to the seat cover, a second aperture for removably receiving a single loop attached to the seat cover, and a third aperture for removably receiving a pair of loops attached to the seat cover, whereby said seat cover is retained on said seat body by engagement of said loops with said apertures.

16. The seat of claim 15 wherein the second aperture is V-shaped and the third aperture is X-shaped.

17. A method for manufacturing a child's car seat comprising the steps of:

forming a unitary shell having an upper back portion, a lower seat portion and a hinge formed therebetween, each of the upper and lower portions including a coacting joint member, each of said coacting joint members including an aperture, wherein said coacting joint members are formed as a mortise and a tenon;

pivoting the upper and lower portions toward each other about the hinge to position the upper and lower portions in a booster seat configuration wherein said mortise and tenon are disposed adjacent each other with their respective apertures aligned coaxially and with said tenon inserted into said mortise; and disposing a locking rod in the aligned apertures to lock the upper and lower portions into a fixed position with respect to each other.

18. A method for manufacturing a child's car seat comprising the steps of:

forming a unitary shell having an upper back portion, a lower seat portion and a hinge formed therebetween, each of the upper and lower portions including a coacting joint member, each of said coacting joint members including an aperture;

pivoting the upper and lower portions toward each other about the hinge to position the upper and lower portions in a booster seat configuration in which said coacting joint members are disposed adjacent each other with their respective apertures aligned coaxially; and disposing a locking rod in the aligned apertures to lock the upper and lower portions into a fixed position with respect to each other, said locking rod being disposed through substantially the entire width of said unitary shell.

19. A child'car seat, comprising:

a unitary shell having an upper back portion and a lower seat portion hingedly connected to said upper back portion by an integral hinge;

a mortise formed on one of said upper and lower portions; and a tenon formed on the other of said upper and lower portion and engageable with said mortise, said upper and lower portions being pivotable about said hinge into a use position in which said mortise and said tenon are engaged.

20. The child's car seat of claim 19, wherein each of said mortise and said tenon includes an aperture formed therein, said apertures being aligned coaxially when said mortise and said tenon are engaged and further including a locking rod disposable in said apertures to interlock said mortise and said tenon to prevent relative movement thereof about said hinge.

* * * * *

UNITED STATES PATENT AND TRADEMARK OFFICE
Certificate

Patent No. 5,845,967

Patented: December 8, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Michael T. Kane, David M. Bapst, Douglas A. Soller, James P. Bicheler and David Prior.

Signed and Sealed this Tenth Day of August, 1999.

PETER M. CUOMO
*Supervisory Patent Examiner*
Art Unit 3624